United States Patent
Herbstritt et al.

(10) Patent No.: US 7,560,908 B2
(45) Date of Patent: Jul. 14, 2009

(54) AUTOMATIC VOLTAGE SWITCHING FOR GENERATOR VOLTAGE CHANGE

(75) Inventors: Dale R. Herbstritt, Clemmons, NC (US); Donald G. Smith, Mocksville, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 301 days.

(21) Appl. No.: 11/743,702

(22) Filed: May 3, 2007

(65) Prior Publication Data

US 2008/0143303 A1 Jun. 19, 2008

Related U.S. Application Data

(60) Provisional application No. 60/870,183, filed on Dec. 15, 2006.

(51) Int. Cl.
*H02P 9/00* (2006.01)
(52) U.S. Cl. .............................. 322/37; 322/11; 322/13; 322/25; 290/40 C; 290/40 A; 290/40 R
(58) Field of Classification Search ................... 322/11, 322/13, 25, 37; 290/40 A, 40 C, 40 R
See application file for complete search history.

(56) References Cited

U.S. PATENT DOCUMENTS

| | | | |
|---|---|---|---|
| 2,522,103 A | 9/1950 | Drake | |
| 3,950,678 A | 4/1976 | Brewer | |
| 4,025,820 A | 5/1977 | Penrod | |
| 4,175,223 A | 11/1979 | Lauritsen et al. | |
| 4,517,426 A | 5/1985 | Edwards et al. | |
| 4,785,376 A | 11/1988 | Dively | |
| 5,278,373 A | 1/1994 | Faber et al. | |
| 5,451,730 A | 9/1995 | Phillips, Sr. | |
| 5,466,903 A | 11/1995 | Faber et al. | |
| 5,506,379 A | 4/1996 | McLean, Jr. et al. | |
| 5,633,483 A | 5/1997 | Oster et al. | |
| 6,229,107 B1 | 5/2001 | Flint et al. | |
| 6,341,981 B1 | 1/2002 | Gorman | |
| 6,678,131 B2 | 1/2004 | Chapman et al. | |
| 7,498,777 B2 * | 3/2009 | Andrieux | 322/45 |
| 7,514,906 B1 * | 4/2009 | Tsujimoto et al. | 322/37 |

* cited by examiner

*Primary Examiner*—Quyen Leung
*Assistant Examiner*—Iraj A Mohandesi
(74) *Attorney, Agent, or Firm*—Michael Best & Friedrich LLP

(57) ABSTRACT

A method of switching the operating voltage of a portable generator system includes operating an electrical generator to produce a first electrical signal and connecting a terminal assembly to the electrical generator. The terminal assembly is arranged in a first arrangement to output a second electrical signal at a first voltage. The method also includes operating an auxiliary system in response to the second electrical signal at the first voltage, re-arranging the terminal assembly in a second arrangement to output the second electrical signal at a second voltage, and actuating a switch with a portion of the terminal assembly when the terminal assembly is in the second arrangement. The method further includes re-configuring the auxiliary system in response to the actuation of the switch such that the auxiliary system operates in response to the second electrical signal at the second voltage.

16 Claims, 6 Drawing Sheets

US 7,560,908 B2

AUTOMATIC VOLTAGE SWITCHING FOR GENERATOR VOLTAGE CHANGE

RELATED APPLICATION DATA

This application claims benefit under 35 U.S.C. Section 119(e) of U.S. Provisional Application No. 60/870,183, filed Dec. 15, 2006, which is fully incorporated herein by reference.

BACKGROUND

The present invention relates to a portable generator system operable at two or more voltages. More specifically, the invention relates to a portable generator system that is substantially automatically switchable between two or more voltages.

Generators, and particularly portable generators, are often operable at two or more voltages to allow the generator to provide power to virtually any system that may require power. For example, 480 V systems and 240 V systems are commonly used throughout the United States. These systems are used interchangeably and in many applications are used in conjunction. Thus, a portable generator that is able to provide power at either voltage is beneficial.

Generally, multiple electrical connections within the generator system must be changed to change the operating voltage. For example, the generator controls and monitoring equipment are generally powered by the generator and as such must be wired for the proper voltage.

Some prior art constructions employ key-actuated switches to make some of the electrical connections required to change voltages. However, the use of keyed-switches is unpopular as the keys are often damaged or lost making a voltage change more difficult. Additionally, the exposure of the switch at an accessible terminal increases the likelihood of accidental undesirable switching.

SUMMARY

In one construction, the invention provides a generator system that includes a prime mover and an electrical generator coupled to the prime mover and configured to produce a first electrical signal in response to operation of the prime mover. A terminal assembly is electrically connected to the electrical generator to receive the first electrical signal and output a second electrical signal. The terminal assembly is configurable in a first arrangement to output the second electrical signal at a first voltage, and in a second arrangement to output the second electrical signal at a second voltage. An auxiliary system is configurable to operate in response to the second electrical signal at one of the first voltage and the second voltage. The prime mover is operable in response to the auxiliary system. A switch is movable between a first position in which the auxiliary system operates in response to the second electrical signal at the first voltage, and a second position in which the auxiliary system operates in response to the second electrical signal at the second voltage. The switch is positioned such that the terminal assembly moves the switch from the first position to the second position in response to movement of the terminal assembly from the first arrangement to the second arrangement.

In another construction, the invention provides a generator system that includes a prime mover, an electrical generator coupled to the prime mover and configured to produce a first electrical signal in response to operation of the prime mover, and a terminal assembly electrically connected to the electrical generator to receive the first electrical signal and output a second electrical signal. The terminal assembly is configurable in a first arrangement to output the second electrical signal at a first voltage, and in a second arrangement to output the second electrical signal at a second voltage. A first electrical output is configured to output the second electrical signal at the first voltage and a second electrical output is configured to output the second electrical signal at the second voltage. A switch is movable between a first position in which the second electrical signal is directed to the first electrical output and is inhibited from flowing to the second electrical output, and a second position in which the second electrical signal is directed to the second electrical output and is inhibited from flowing to the first electrical output. The switch is positioned such that the terminal assembly moves the switch from the first position to the second position in response to movement of the terminal assembly from the first arrangement to the second arrangement.

In yet another construction, the invention provides a method of switching the operating voltage of a portable generator system. The method includes operating an electrical generator to produce a first electrical signal and connecting a terminal assembly to the electrical generator. The terminal assembly is arranged in a first arrangement to output a second electrical signal at a first voltage. The method also includes operating an auxiliary system in response to the second electrical signal at the first voltage, re-arranging the terminal assembly in a second arrangement to output the second electrical signal at a second voltage, and actuating a switch with a portion of the terminal assembly when the terminal assembly is in the second arrangement. The method further includes re-configuring the auxiliary system in response to the actuation of the switch such that the auxiliary system operates in response to the second electrical signal at the second voltage.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 6:
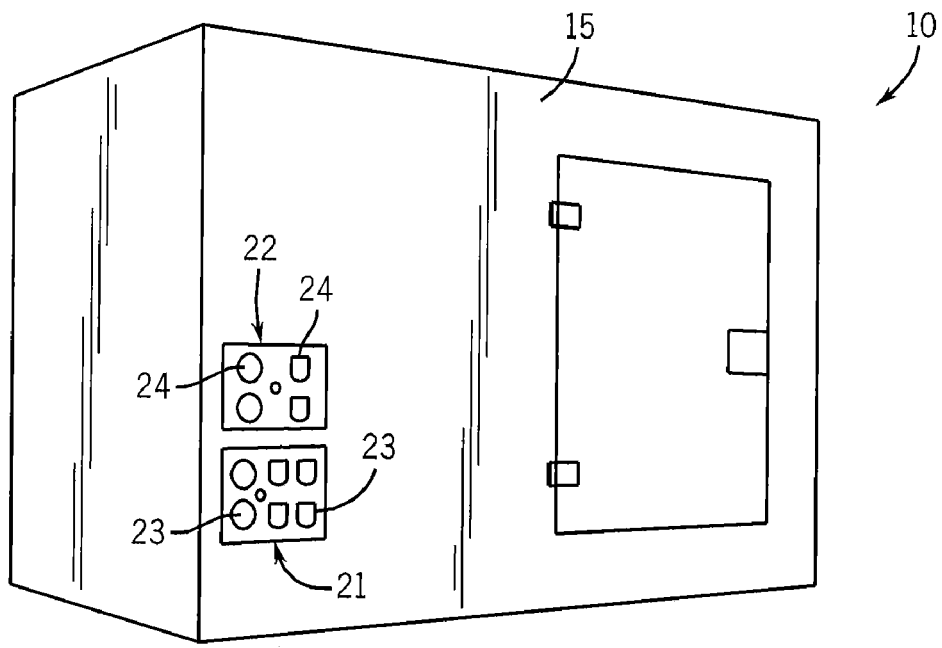
FIG. 6 is a perspective view of a generator system including a housing or enclosure.
Figure 7:
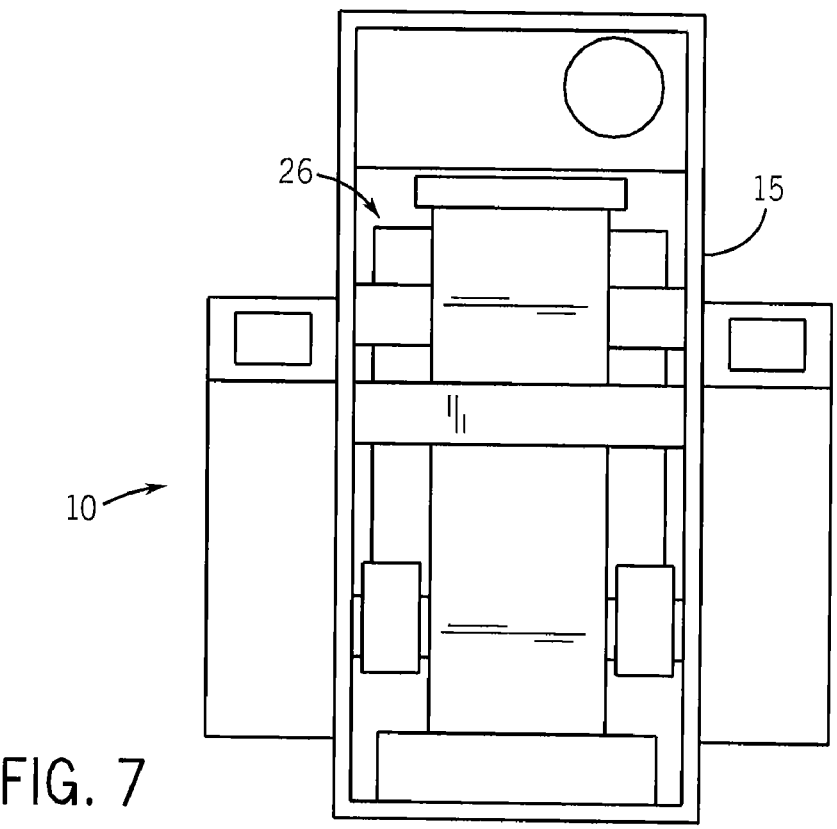
FIG. 7 is a partially broken away view of the interior of the generator system of FIG. 6.
Figure 8:
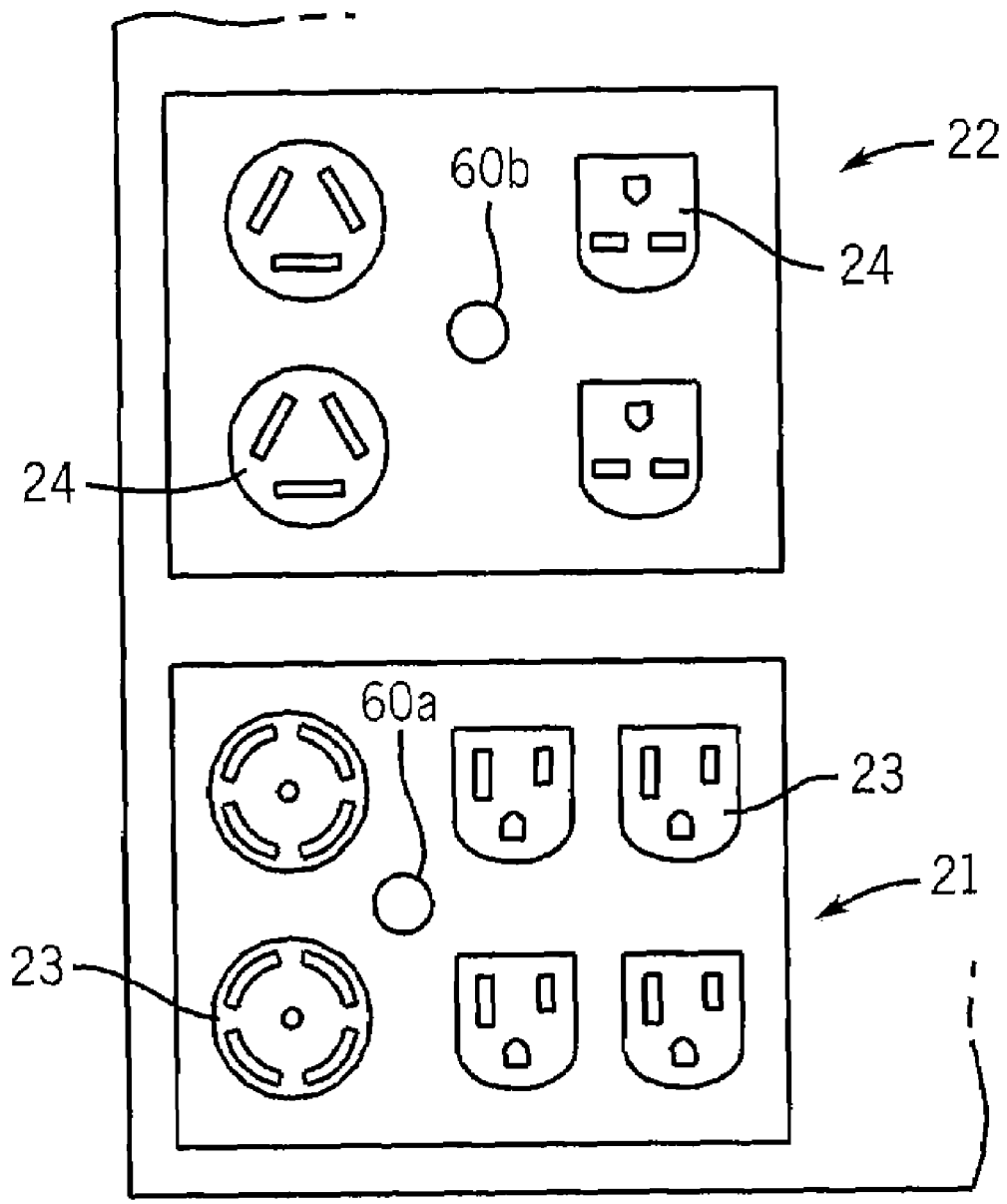
FIG. 8 is an enlarged front view of a portion of the housing of FIG. 6 including output panels.
Figure 9:
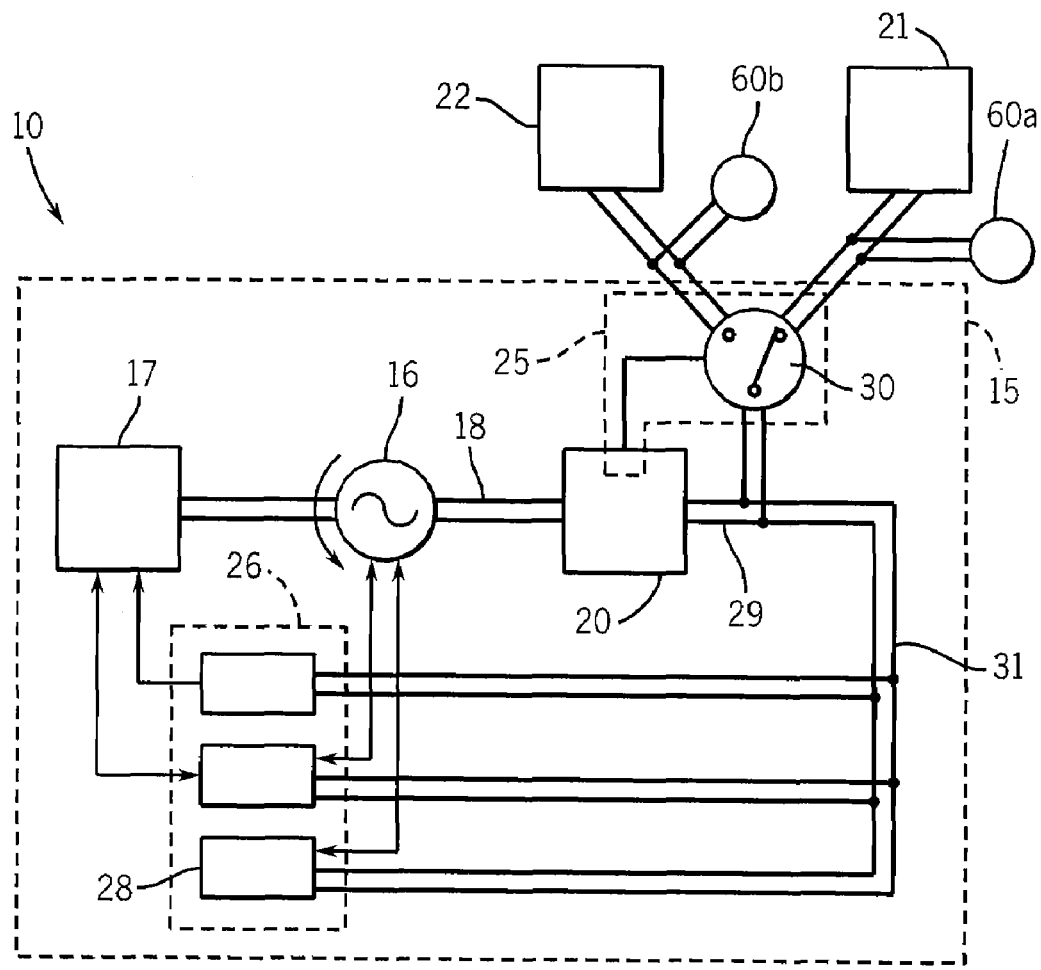
FIG. 9 is a schematic illustration of the generator system of FIG. 6.

A typical generator system 10 includes an enclosure or housing 15 (shown in FIGS. 6 and 7) that encloses many of the generator system components and supports any external controls and displays. In some constructions, the housing is supported on a movable frame (i.e., wheeled frame) that allows for movement of the generator system 10. An electrical generator 16 and a prime mover 17, shown schematically in FIG. 9, are disposed substantially within the housing 15. The electrical generator 16 may be a synchronous generator, an asynchronous generator, or an alternator if desired. In addition, other types of electrical generators are possible. So long as the electrical generator 16 is capable of outputting a current at the desired voltage and frequency and including the desired number of phases to a point of use, it is likely suitable for use in the generator system 10.

In some constructions, a rectifier and an inverter, or other signal conditioning components are employed to adjust an input current, or first electrical signal 18, delivered by the electrical generator 16 to a desired frequency and/or voltage. The output of the signal conditioning equipment in these constructions is then delivered to the point of use.

Many different prime movers 17 are suitable for use with the generator 16, with gasoline or diesel engines being preferred. However, virtually any prime mover 17 capable of rotating the electrical generator 16 at the desired speed and torque could be employed as the prime mover 17. For example, turbine engines (e.g., combustion turbine, microturbine, steam turbine, etc.) could be employed in some constructions if desired.

Fuel for the prime mover 17 may be contained within the enclosure 15, external to the enclosure 15, or may be delivered to the prime mover 17 via an external source (e.g., pipeline, gas supply, etc.). In addition, the housing 15 generally includes one or more air intake paths that allow for the passage of external air to the prime mover 17 for combustion and cooling. An exhaust opening is also provided to allow for the discharge of exhaust gases that are produced during combustion.

Additional components such as heat exchangers, cooling systems, valves, controls, fuel systems, etc, may also be located within the housing 15 to protect the components and to inhibit unwanted tampering.

The generator system 10 includes a power output terminal assembly 20 that is connected to the electrical generator 16 such that the generated electricity, or first electrical signal 18 is delivered to the terminal assembly 20. The terminal assembly 20 is also electrically coupled to at least one of a plurality of outputs that allow for the connection of electrical equipment to the generator system 10. In a preferred construction, the terminal assembly 20 is arrangeable in one of at least two configurations to vary the output voltage of the generator system 10. When arranged in a first arrangement (FIGS. 1 and 2), the terminal assembly 20 delivers power, or a second electrical signal 29 at a first or low voltage to one of a plurality of first outputs 21 adapted to deliver power at the first or low voltage. When arranged in a second arrangement, the terminal assembly 20 delivers power at a second or high voltage to one of a plurality of second outputs 22 adapted to deliver power at the second or high voltage.

In a preferred construction, the plurality of first outputs 21 includes a plurality of receptacles 23 arranged to deliver a specified amount of current at the desired voltage. Each of the receptacles 23 may include a fuse or breaker that inhibits the delivery of current in excess of the desired limit. Similarly, the plurality of second outputs 22 may include a plurality of similar receptacles 24 adapted to deliver power at the second voltage.

In most constructions, the generator system 10 includes auxiliary systems 26 that may include a control system 26a, a fuel delivery system 26b, a voltage regulator 28, and/or a plurality of indicators that are each powered by current provided by the generator 16. As such, these components must be able to operate at the voltage delivered by the electrical generator 16. Additionally, they must be switchable between these voltages. The voltage regulator 28, shown in FIG. 9, is employed to deliver a field current or control to the electrical generator 16 to control the output voltage of the electrical generator 16. Thus the voltage regulator 28 needs to be adjusted for the correct input voltage to assure the proper operation of the electrical generator 16 in the proper output voltage range.

In prior art generator systems, a user must switch the electrical connections for each of these auxiliary systems as well as reconfigure the bus to switch between voltages. However, it is possible to forget to switch one or more of the components, thus resulting in improper operation of the system and potential damage to the improperly wired components.

Figure 1:
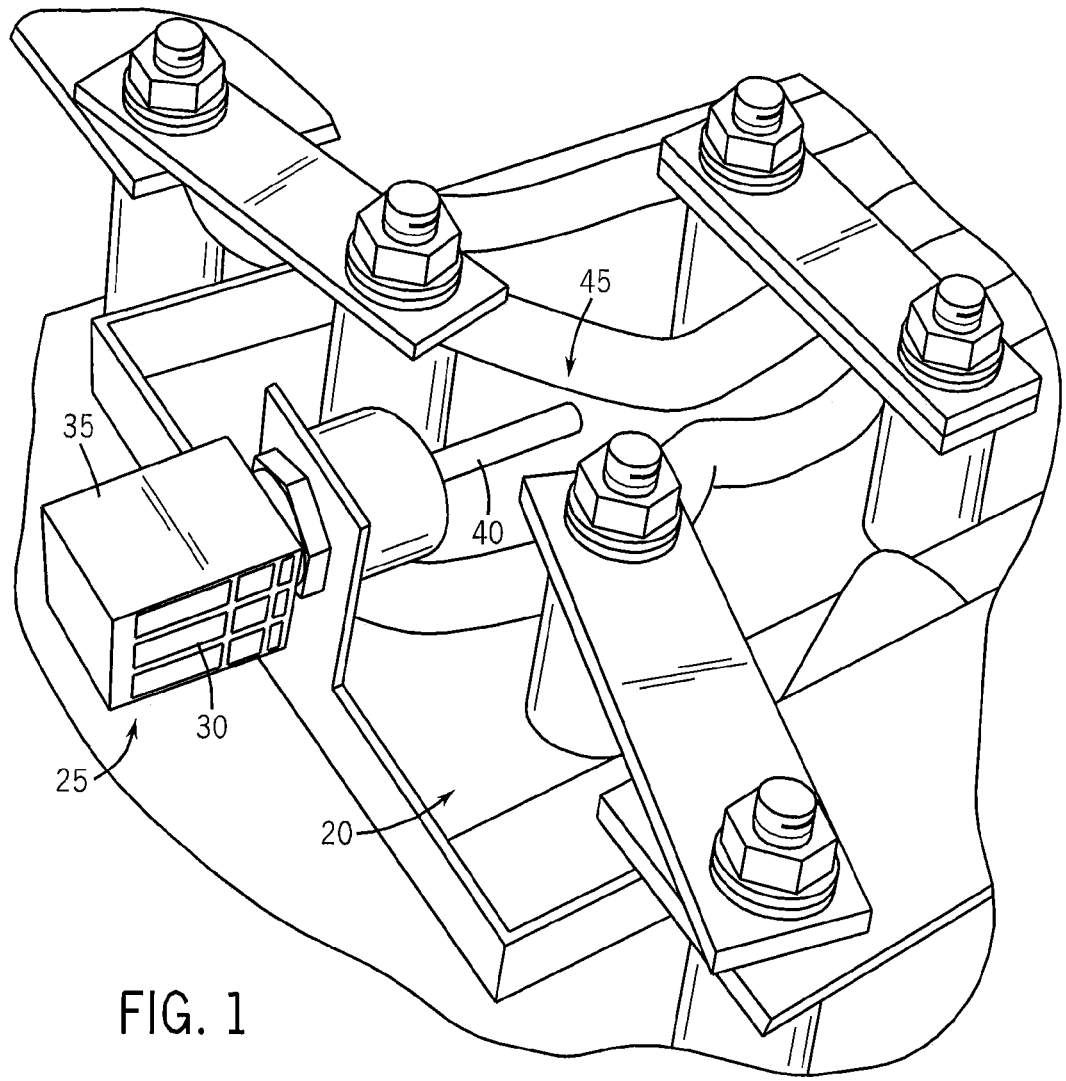
FIG. 1 is a perspective view of a portion of a generator system including an automatic voltage change device embodying the invention.
Figure 2:
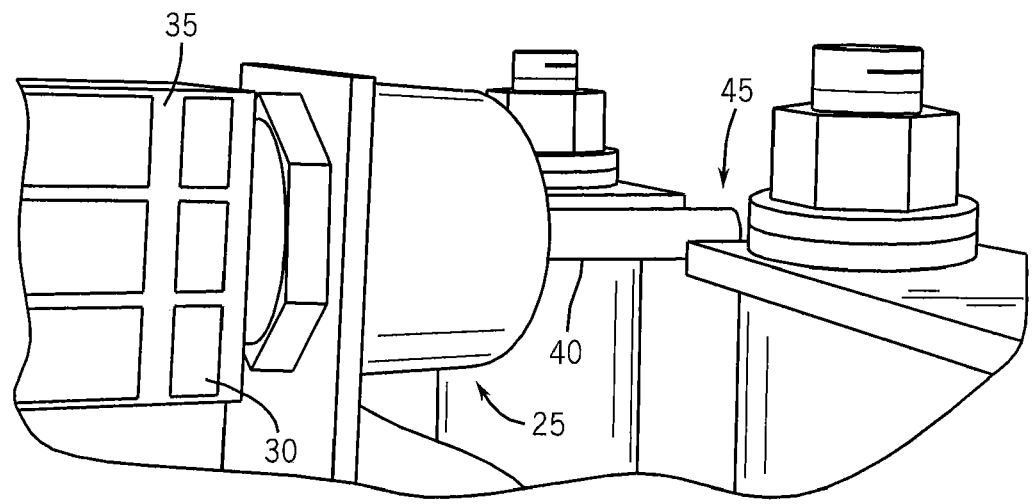
FIG. 2 is a perspective view of the portion of the generator system including the automatic voltage change device in a first position.
Figure 4:
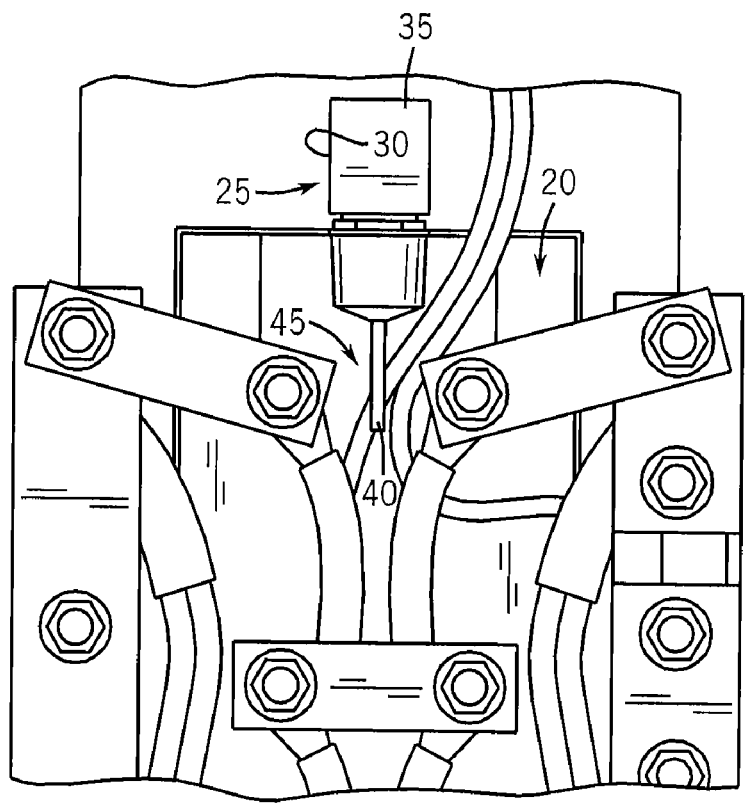
FIG. 4 is a top view of the portion of the generator system including the automatic voltage change device of FIG. 1 in the first position.

With reference to FIGS. 1, 2 and 4, the generator system 10 includes the terminal assembly 20 arranged in a first or low voltage configuration. A multi-pole switch 25 is positioned adjacent the terminal assembly 20 and includes multiple contacts 30 held within a switch body 35, and an actuator 40 extending from the switch body 35. The actuator 40 is biased into a first position as illustrated in FIGS. 1 and 2. The voltage regulator 28 and/or auxiliary systems 26 are electrically connected to the switch 25, which in turn is electrically connected to the terminal assembly 20.

When the actuator 40 is in the first position, as illustrated in FIGS. 1, 2, and 4, the electrical connections made by the contacts 30 within the switch 25 are such that the voltage regulator 28 and the other auxiliary systems 26 are wired for the first or low voltage. When the actuator 40 is moved to a second position, illustrated in FIG. 3, the contacts 30 within the switch 25 change such that the voltage regulator 28 and any other auxiliary systems 26 are wired for a second or high voltage. Thus, the wiring changes required to switch between voltages are automatically made by the switch 25.

However, to complete a voltage switch in the generator system 10, the terminal assembly 20 must also be reconfigured. The terminal assembly 20 illustrated in FIGS. 1, 2, and 4 is configured for the first or low voltage. In this configuration, the actuator 40 extends into a space 45 and makes no contact with any other components. As such, the actuator 40 is biased into its first position. Thus, the terminal assembly 20, the voltage regulator 28, and the other auxiliary systems 26 are all arranged for the first or low voltage.

Figure 3:
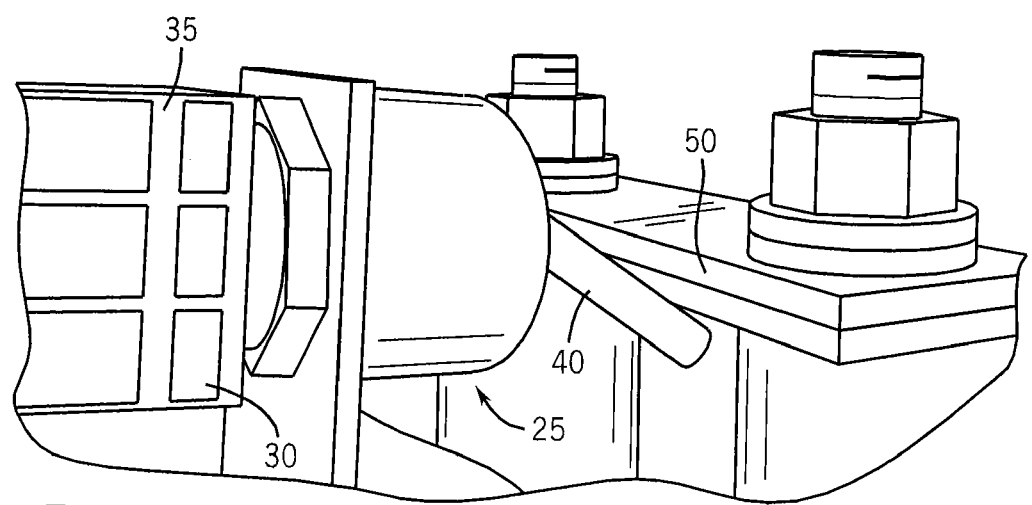
FIG. 3 is a perspective view of the portion of the generator system including the automatic voltage change device in a second position.
Figure 5:
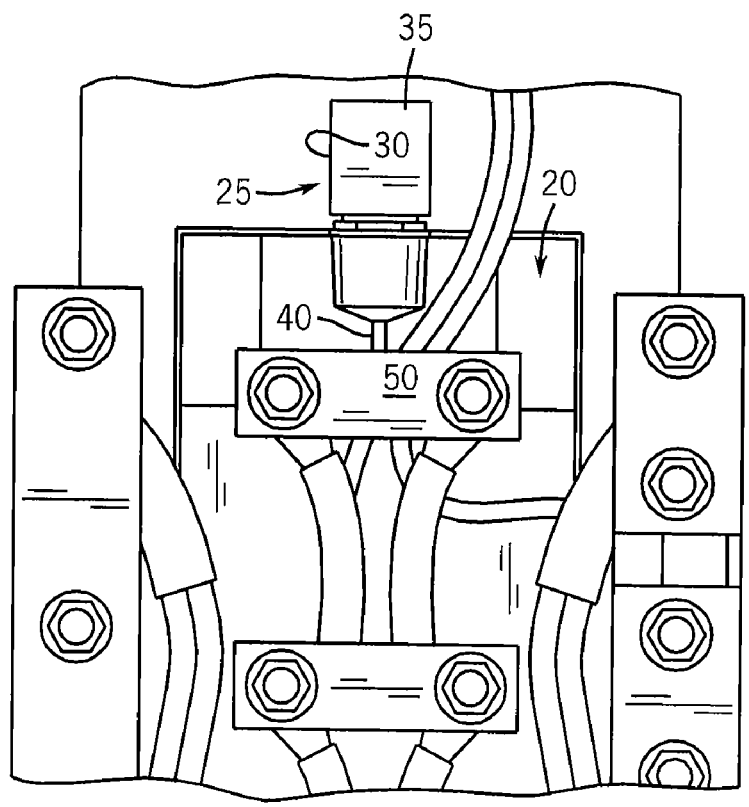
FIG. 5 is a top view of the portion of the generator system including the automatic voltage change device of FIG. 1 in the second position.

FIGS. 3 and 5 illustrate the terminal assembly 20 arranged in the second or high voltage arrangement. In this arrangement, a bus bar 50 extends across the space 45 previously occupied by the actuator 40. Thus, the bus bar 50 forces the actuator 40 into its second or high voltage position. Thus, the terminal assembly 20, the voltage regulator 28, and the other auxiliary systems 26 are all arranged for the second or high voltage.

In use, an operator or user simply needs to properly configure the terminal assembly 20 in order to properly configure the generator system 10 for the desired output voltage. No knowledge is required as to what connections the switch 25 is making. So long as the user properly arranges the terminal assembly 20 (i.e., positions the bus bar 50), the proper electrical connections to the voltage regulator 28 and other auxiliary systems 26 will be made.

In one construction, the generator system 10 includes an external indicator 60a, 60b (e.g., light) that indicates which voltage the generator system 10 is arranged to deliver. Such an indicator 60a, 60b can be easily controlled by the switch 25 to give the desired indication. While a light is described herein, any indicator perceptible to the user would be suitable for use.

In some constructions, more than two arrangements of the terminal assembly 20 may be desired (e.g., a three voltage system). In these systems, multiple switches 25 could be employed or a three position switch could be employed to make the necessary connections between the terminal assembly 20 and the voltage regulator 28 and/or any other auxiliary systems 26.

It should be noted that the illustrated construction illustrates the switch 25 as being biased into the first or low voltage position. Of course, other arrangement could be biased into the high voltage position and thus require actuation to move to the low voltage position. As such, the invention should not be limited to the particular switch arrangement illustrated herein.

In preferred constructions, the switch 25 is disposed within the housing 15 rather than on an operator accessible panel. Thus, unwanted or even accidental tampering with the switch 25 is inhibited. The location of the switch 25 is such that it is typically only intentionally actuated.

The constructions illustrated herein reduce the likelihood of errors in electrical connections when a voltage switch is made, thereby reducing the likelihood of component damage or improper operation. Additionally, no keys or external devices are required to make voltage changes, thereby making an accidental partial voltage change (i.e., changing the connections for only a portion of the system) difficult.

Thus, the invention provides, among other things, a generator system 10 operable to output power at two or more voltages. The generator system 10 is automatically switchable between at least two voltages.

What is claimed is:

1. A generator system comprising:
   a prime mover;
   an electrical generator coupled to the prime mover and configured to produce a first electrical signal in response to operation of the prime mover;
   a terminal assembly electrically connected to the electrical generator to receive the first electrical signal and output a second electrical signal, the terminal assembly configurable in a first arrangement to output the second electrical signal at a first voltage, and in a second arrangement to output the second electrical signal at a second voltage;
   an auxiliary system configurable to operate in response to the second electrical signal at one of the first voltage and the second voltage, the primer mover operable in response to the auxiliary system; and
   a switch movable between a first position in which the auxiliary system operates in response to the second electrical signal at the first voltage, and a second position in which the auxiliary system operates in response to the second electrical signal at the second voltage, the switch positioned such that the terminal assembly moves the switch from the first position to the second position in response to movement of the terminal assembly from the first arrangement to the second arrangement.

2. The generator system of claim 1, wherein the terminal assembly includes a plurality of buss bars, and wherein at least one of these buss bars is in a first position when the terminal assembly is configured in the first arrangement and is in a second position when the terminal assembly is configured in the second arrangement.

3. The generator system of claim 2, wherein the switch includes an actuator that is moved from a first position to a second position in response to the placement of one of the buss bars in the second position.

4. The generator system of claim 3, wherein the actuator is based to the first position.

5. The generator system of claim 1, wherein the auxiliary system includes at least one of a fuel pump and a control system.

6. The generator system of claim 1, wherein the auxiliary system includes a control system and a voltage regulator.

7. The generator system of claim 1, further comprising a first electrical output configured to output the second electrical signal at the first voltage, and a second electrical output configured to output the second electrical signal at the second voltage.

8. The generator system of claim 7, wherein the switch is operable to direct the second electrical signal to the first electrical output and inhibit the flow of the second electrical signal to the second electrical output when the switch is in the first position, and to direct the second electrical signal to the second electrical output and inhibit the flow of the second electrical signal to the first electrical output when the switch is in the second position.

9. The generator system of claim 1, further comprising a visual indicator coupled to the switch and operable to provide a visual indication indicative of the voltage of the second electrical signal.

10. A generator system comprising:
    a prime mover;
    an electrical generator coupled to the prime mover and configured to produce a first electrical signal in response to operation of the prime mover;
    a terminal assembly electrically connected to the electrical generator to receive the first electrical signal and output a second electrical signal, the terminal assembly configurable in a first arrangement to output the second electrical signal at a first voltage, and in a second arrangement to output the second electrical signal at a second voltage;
    a first electrical output configured to output the second electrical signal at the first voltage;
    a second electrical output configured to output the second electrical signal at the second voltage; and
    a switch movable between a first position in which the second electrical signal is directed to the first electrical output and is inhibited from flowing to the second electrical output, and a second position in which the second electrical signal is directed to the second electrical output and is inhibited from flowing to the first electrical output, the switch positioned such that the terminal assembly moves the switch from the first position to the second position in response to movement of the terminal assembly from the first arrangement to the second arrangement.

11. The generator system of claim 10, wherein the terminal assembly includes a plurality of buss bars, and wherein at least one of these buss bars is in a first position when the terminal assembly is configured in the first arrangement and is in a second position when the terminal assembly is configured in the second arrangement.

12. The generator system of claim 11, wherein the switch includes an actuator that is moved from a first position to a second position in response to the placement of one of the buss bars in the second position.

13. The generator system of claim 12, wherein the actuator is based to the first position.

14. The generator system of claim 10, wherein the auxiliary system includes at least one of a fuel pump and a control system.

15. The generator system of claim 10, wherein the auxiliary system includes a control system and a voltage regulator.

16. The generator system of claim 10, further comprising a visual indicator coupled to the switch and operable to provide a visual indication indicative of the voltage of the second electrical signal.

\* \* \* \* \*